No. 817,910.  
PATENTED APR. 17, 1906.
H. GERIKE.  
DEVICE FOR PROTECTING THE SEALS OF THE BUNGS OR OTHER CLOSURES OF CASKS.  
APPLICATION FILED JULY 26, 1905.
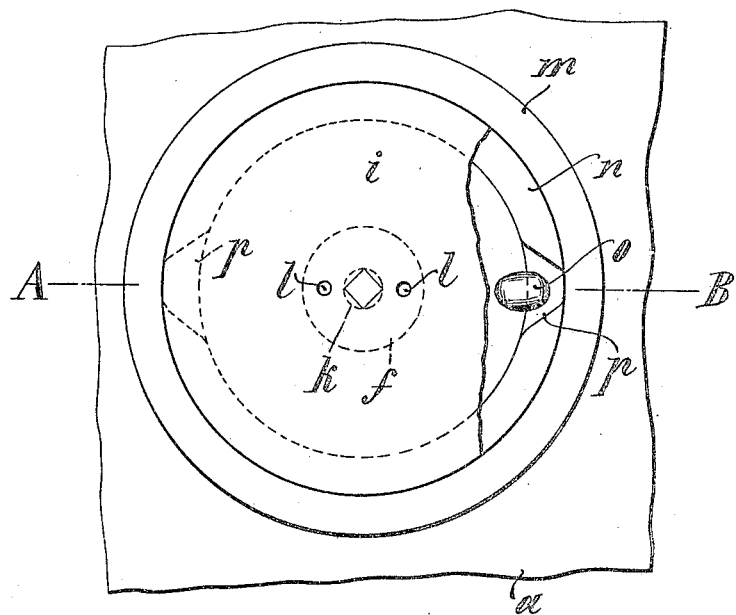
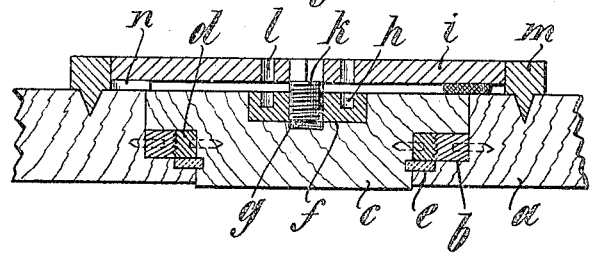
Witnesses:
Inventor:  
Hugo Gerike  
by Eustace W. Hopping  
Attorney

UNITED STATES PATENT OFFICE.

HUGO GERIKE, OF KLEIN SCHÖNEBECK, NEAR BERLIN, GERMANY, ASSIGNOR TO GUSTAV HEYDEN, OF SCHÖNEICHE, NEAR BERLIN, GERMANY.

DEVICE FOR PROTECTING THE SEALS OF THE BUNGS OR OTHER CLOSURES OF CASKS.

No. 817,910.     Specification of Letters Patent.     Patented April 17, 1906.

Application filed July 26, 1905. Serial No. 271,331.

*To all whom it may concern:*

Be it known that I, HUGO GERIKE, a citizen of the German Empire, residing at Klein Schönebeck, near Berlin, German Empire, have invented a new and useful Improved Device for Protecting the Seal of the Bung or other Closure of a Cask, of which the following is a description.

The present invention consists of a device for protecting the seal of the bung or other closure of a cask and of the details of construction hereinafter set forth, and particularly pointed out in the claims.

In order to render the present specification easily intelligible, reference is had to the accompanying drawings, in which similar letters of reference denote similar parts throughout both views.

Figure 1 is a plan of the device, partly broken away to show the inner annular flange; and Fig. 2 is a central vertical section through the closure and protecting-plate for the seal.

The closure of the cask $a$ consists of the metal ring $b$, having interior screw-thread and let into the stave of the cask, and the bung or closure $c$, having a metal ring $d$, externally threaded and adapted to screw into the ring $b$ and lie flush with the outer surface of the cask. In the center of the bung or plug $c$ a metal plate $f$ is provided having a threaded hole $g$ in the center and two smaller orifices, one at each side of the central one, into which a key may be inserted in order to screw the bung into the cask-opening. The seal is usually applied as at $o$. Around the cask-opening or bung-hole a metal ring $m$ is provided having an interior annular flange $n$, with recesses $p$ for the reception of the seal $o$.

The protecting-plate $i$ for the seal is adapted to fit into the ring $m$ and rest on the annular flange $n$, the said plate being provided with the central threaded stud $k$, adapted to screw into the orifice $g$ of the bung. Two holes $l\ l$ are provided, one at each side of the central stud and corresponding in position to the orifices $h$, so that a single key will suffice for screwing home with the bung $c$ and the protecting-plate $i$. In order to prevent the unscrewing of the bung when the protecting-plate is removed, the screw attachments $b\ d$ and $k\ g$ are provided with opposite threads, one having a right-hand and the other a left-hand thread, so that the parts will mutually act as a check-nut.

I claim as my invention—

1. A device for protecting the seal of a screw-closure of a cask consisting of a ring having interior annular flange and a circular protecting-plate having central threaded stud to screw into a central orifice of the cask-closure, and lie on the said annular flange over the seal substantially as described.

2. A device for protecting the seal of a screw-closure of a cask, consisting of a ring having an interior annular flange and a circular protecting-plate having a central threaded stud to engage a threaded opening in the cask-closure, the said thread being in the opposite direction to the thread of the closure or bung substantially as described.

In testimony whereof I affix my signature in the presence of two witnesses.

HUGO GERIKE.

Witnesses:
    WOLDEMAR HAUPT,
    HENRY HASPER.